Jan. 18, 1944.    A. P. DAVIS    2,339,241
SPINNING DEVICE FOR LANDING GEAR WHEELS OF AIRPLANES AND THE LIKE
Filed April 25, 1942
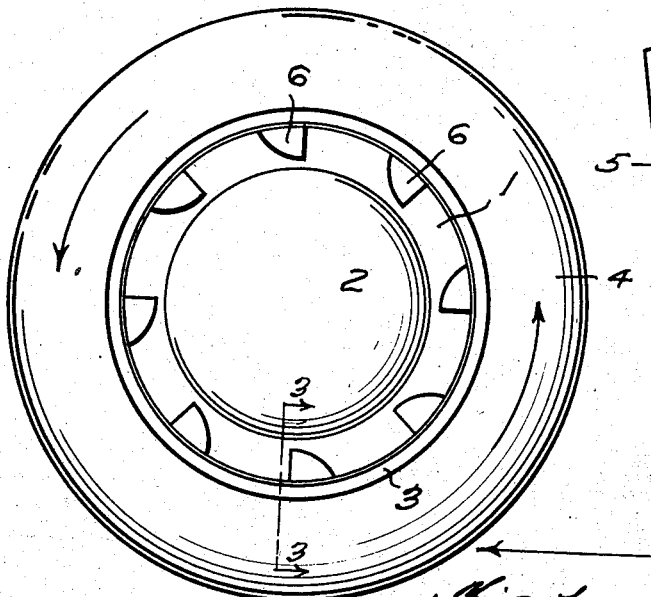
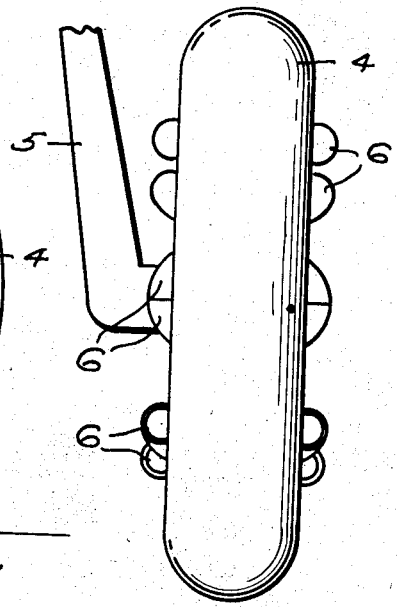
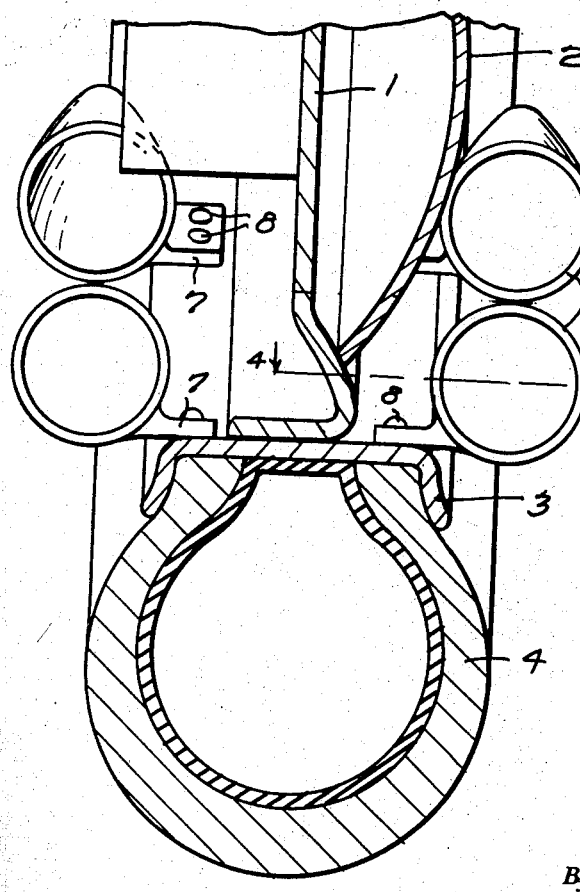
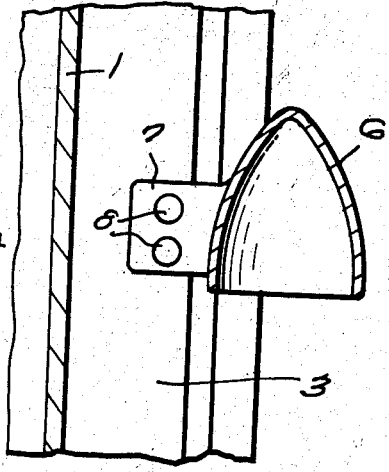
Inventor
Albert P. Davis Patented Jan. 18, 1944

2,339,241

UNITED STATES PATENT OFFICE 2,339,241

SPINNING DEVICE FOR LANDING-GEAR WHEELS OF AIRPLANES AND THE LIKE

Albert Pflomm Davis, Oaklyn, N. J.

Application April 25, 1942, Serial No. 440,554

1 Claim. (Cl. 244—103)

My invention relates to improvements in spinning devices for the ground wheels of landing gear of airplanes, dirigibles, and similar aircraft.

The invention is designed with the principal object in view of equipping such wheels for wind propulsion during landing in the direction of travel of the aircraft and at approximately the speed of travel of the aircraft, to thereby reduce strain on the landing gear, incident to landing, obviate wear on the wheel tires, promote smooth landing, and prevent nosing over of airplanes during landing.

An important object of the invention is to provide an airplane wheel which in operation will help to balance the aircraft and in landing serve to prevent accidents, especially when landing on rough terrain or emergency landing fields.

Other and subordinate objects are also comprehended by my invention, all of which, together with the precise nature of my improvements, will be readily understood when the succeeding description and claim are read with reference to the drawing accompanying and forming part of the specification.

In the drawing—

Figure 1 is a view in side elevation of a landing gear wheel equipped according to my invention.

Figure 2 is a view in front elevation.

Figure 3 is a view in transverse section taken on the line 3—3 of Figure 1 and drawn to an enlarged scale, and Figure 4 is a view in section taken on the line 4—4 of Figure 3.

Referring to the drawing by numerals, my invention has been shown therein as forming part of the equipment of a well known disk-type landing gear ground wheel, 1 designating the web, 2 the hub cap, 3 the rim, and 4 the pneumatic tire, the wheel being shown as carried by the usual leg 5 of the landing gear.

According to my invention, a series of cup-like scoops 6 is mounted on either one or both sides of the wheel and spaced equidistantly and circumferentially around the wheel as near the periphery of the wheel as is practicable, there being as many scoops in each series as may be found expedient to obtain the proper speed of rotation of wheels of different sizes. The scoops 6 are preferably substantially conoidal in shape and formed of any suitable light, strong metal or other material. The scoops 6 in each series are arranged on the wheel with their open ends facing in a direction opposite to the direction of rotation of the wheel in landing whereby said open ends of some of the scoops below the horizontal center of the wheel always face in the direction of travel of the aircraft when landing. As shown in the drawing, each scoop 6 is provided with a lateral attaching lug 7 riveted, or bolted or otherwise secured as at 8, to one edge of the rim 3 so that the scoop projects laterally beyond the rim 3.

The operation of the described invention will be readily understood. The scoops 6 which are lowermost on the wheel are forced into the wind during landing operations with the result that they are wind propelled to rotate the wheel in the proper direction during landing. Any suitable braking mechanism for the wheel may be utilized to hold the same stationary and release the same for rotation during landing operations, but since such mechanism forms no part of the present invention, it has not been deemed necessary to illustrate a brake mechanism.

The foregoing will, it is believed, suffice to impart a clear understanding of my invention without further explanation.

Obviously, the lugs 7 may be attached to the airplane wheel by welding or through any other attaching method or means found feasible, especially in instances where the aircraft wheel is streamlined by the addition of streamlining side plates, etc.

Manifestly, the invention, as described, is susceptible of modification without departing from the inventive concept, and right is herein reserved to such modifications as fall within the scope of the subjoined claim.

What I claim is:

The combination with the tire mounting rim of an airplane ground wheel, of a series of wind scoops of conoidal form internally and externally spaced apart around one edge of the rim and outwardly of said edge with open ends facing in a direction opposite to the direction of rotation of the rim, and each provided with a lug extending laterally from one side thereof and bolted flat to the internal face of the rim.

ALBERT PFLOMM DAVIS.